Sept. 19, 1967  E. H. DOMECKI  3,342,136
LIQUID SUPPLY CIRCUIT
Filed Sept. 7, 1965

INVENTOR.
EDWARD H. DOMECKI
BY
Cyril M. Hajewski
ATTORNEY

United States Patent Office 3,342,136
Patented Sept. 19, 1967

3,342,136
LIQUID SUPPLY CIRCUIT
Edward H. Domecki, Lighthouse Point, Fla.
(2256 NE. 25th St., Pompano Beach, Fla. 33064)
Filed Sept. 7, 1965, Ser. No. 485,406
4 Claims. (Cl. 103—6)

ABSTRACT OF THE DISCLOSURE

A water supply system having a storage tank that is provided with a cushion of air and a metering device for indicating when the air supply is low to actuate a valve that admits air under atmospheric pressure into the system for a predetermined period of time immediately prior to the operation of a pump which supplies water to the tank to restore the pressure in the tank to a predetermined value in response to the operation of a switch.

---

Figures 1, 2:
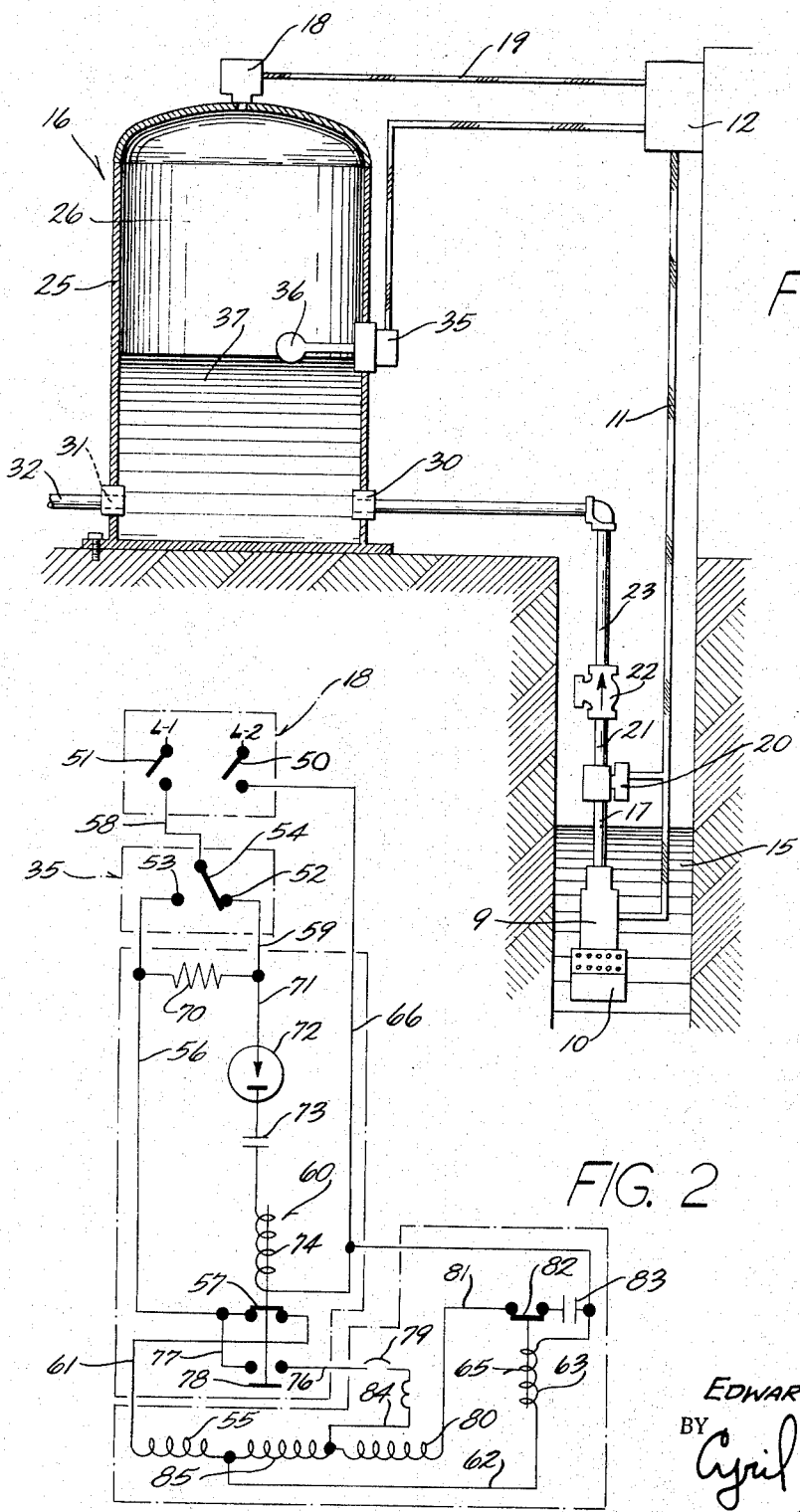

In water supply systems the water is pumped from the well into a storage tank where it is maintained under pressure for immediate availability at any of the outlets connected to the storage tank. When a demand for water exists, a valve is opened at the desired outlet and the pressure in the storage tank forces the water into the connecting conduits for discharge through the open outlet.

In order to absorb the shock of the water pressure entering the storage tank, a cushion of air is maintained in the top of the tank. This minimizes the noise that occurs during the initial surge when water is pumped into the storage tank or drawn from it, and eliminates the heavy strains that would otherwise be placed upon the entire circuit by such surges.

It is a general object of the present invention to provide an improved arrangement for supplying air to serve as a cushion in the water storage tank of a water supply system.

Another object of the present invention to provide a positive acting air inlet for supplying air to the water storage tank of a water supply system.

Another object is to provide an air inlet system for the storage tank of a water supply system which can be accurately regulated to control the amount of air admitted into the storage tank.

A further object is to provide the storage tank of a water supply system with an air inlet that is not subject to being clogged by corrosives and foreign matter.

A further object is to provide a water supply system having an air inlet that is of simple and inexpensive construction but efficient in operation.

According to this invention the improved air inlet arrangement comprises a solenoid operated air inlet valve connected in the conduit that carries the supply of water pumped into the storage tank of a water supply system.

The solenoid valve operates in conjunction with a pressure switch that is actuated by a minimum pressure in the tank to initiate operation of the water pump for delivering more water in the tank from the water source. When the supply of air in the storage tank is reduced to a predetermined minimum the solenoid valve is opened the next time the pressure switch is actuated in response to a reduction of the pressure in the tank to call for more water. The solenoid valve remains open for a preset period of time to admit an accurately regulated volume of air into the circuit before the water pump is energized for pumping water into the tank. The air, of course, is thereby forced into the storage tank where it rises to the top of the tank to serve as a cushion.

The foregoing and other objects of this invention, which will become more fully apparent from the following detailed description of an embodiment thereof may be achieved by the apparatus herein described by way of example in connection with the illustration of its structural components in the accompanying drawings, in which:

FIGURE 1 is a view partly in elevation and partly in vertical section illustrating a water supply system incorporating the features of the present invention; and FIGURE 2 is a diagrammatic view illustrating an electrical circuit for regulating the operation of the water supply system depicted in FIGURE 1.

Reference is now made more particularly to the drawings and specifically to FIGURE 1 thereof which illustrates a water supply system incorporating the features of the present invention. The water supply system comprises a pump 10 driven by an electric motor 9 that is energized selectively by electrical energy transmitted through a cable 11 from a pump control box 12. The pump 10 is illustrated as a submersible pump although other types may be employed. The pump 10 is shown submerged in a water source 15 which is normally a well located beneath the earth's surface. When energized, the pump 10 pumps the water from the source 15 to a storage tank generally identified by the reference numeral 16. The water is transmitted from the pump 10 by a conduit 17 which is connected to a solenoid valve 20. From the solenoid valve 20 the water passes through a conduit 21 and thence through a check valve 22 that precludes the reverse flow of water in the circuit. From the check valve 22 the water flows into a conduit 23 that is in communication with the storage tank 16 for supplying water thereto. The storage tank 16 comprises a cylindrical container 25 which is completely enclosed for storing a quantity of water and air under pressure. It is provided with an inlet 30 through which the water from the pump 10 is admitted. The water is discharged out of the cylinder 25 through a discharge port 31 that is in communication with a conduit 32 that supplies water to the various outlets (not shown) of the system.

The storage tank 16 includes a pressure switch 18 that is connected by a cable 19 to the control box 12 which regulates the operation of the motor 9 in response to the actuation of the pressure switch 18. The latter, of course, is actuated to energize the motor 9 for the delivery of more water into the container 25 whenever the pressure therein is reduced to a minimum by the withdrawing of water therefrom. When the pressure within the container is restored to a predetermined value, the pressure switch is deactuated to interrupt the circuit to the motor 9 for terminating the pumping of water into the container 25.

There is also provided a float switch 35 that is actuated by a float 36 which is pivotably connected to the body of the switch 35 for actuating and deactuating the latter. The float 36 extends outwardly of the valve 35 into the container 25 to float upon the surface of the water 37 within the container 25. It will be noted that the upper portion of the container 25 is filled with a cushion of air 26 above the level of the water 37. A portion of the air 26 will dissolve in the water 37 and will otherwise escape from the interior of the container 25. The air 26 is therefore slowly dissipated from the interior of the container 25 and as the air dissipates progressively more water 37 will be required in the container 25 to develop the designated pressure within the tank 25 to deactuate the pressure switch 18 for deenergizing the motor 9 to stop operation of the pump 10. As the level of the water 37 rises within the container 25 by reason of a reduction in the amount of air 26 therein, the float 36 will be forced upwardly a corresponding amount until it actuates the switch 35.

The initial actuation of the switch 35 has no effect until the next time the pressure switch 18 is actuated to call for more pressure within the container 25. When this occurs, the motor 9 will not be immediately energized, but instead, the solenoid valve 20 will be actuated for a predetermined period of time to admit a specific quantity of air into the system before the pump 10 begins operating. Upon the expiration of the designated period of time, the solenoid valve 20 automatically closes to exclude the air from the system, and the motor 9 becomes energized to operate the pump 10 for delivering water from the source 15 to the interior of the container 25. Of course, since a quantity of air has been admitted into the storage container 25, a lesser amount of water will be required to restore the pressure within the tank 25 for deactuating the pressure switch 18. Accordingly, the amount of air 26 in the tank will be increased while the quantity of water 37 will be reduced by the desired amount.

The valve 20 is fabricated of a material that is highly resistant to corrosion so that its opening does not become clogged. In addition, the positive actuation of the valve 20 by its cooperating solenoid also tends to loosen any dirt that may reach the valve 20 so that there is very little possibility of its becoming clogged during continued use. Moreover, the valve 20 remains open a predetermined period of time in response to the actuation of the switch 35 so that an accurate predetermined quantity of air is always admitted to the system every time the switch 35 is actuated. Since the area of the opening in the valve 20 is not reduced appreciably during prolonged use, the quantity of air admitted into the container 25 remains substantially constant so that proper conditions within the container are maintained during continued use of the system.

The electrical circuit for controlling the operation of the apparatus depicted in FIG. 1 is illustrated diagrammatically in FIG. 2. The circuit is energized from a source represented by the lines L–1 and L–2. The pressure switch 18 is normally open and has two movable contacts 50 and 51 which may be actuated into engagement with their cooperating terminals to close the switch for energizing the circuit whenever the pressure within the tank 25 is reduced to a predetermined minimum. The float switch 35 is a double throw switch having a pair of terminals 52 and 53 and a movable contact 54 which is normally in engagement with the terminal 52. As previously mentioned, the float switch 35 is actuated by the rising of the float 36 due to a high level of water 37 in the container 25.

When the level of the water 37 is normal or less than normal within the container 25, the movable contact 54 of the float switch 35 is in electrical engagement with its cooperating terminal 52. With the contact 54 in this position, the closing of the pressure switch 18 will complete a circuit for energizing the motor 9 without actuating the solenoid valve 20. On the other hand, if the level of the water 37 moves the float 36 high enough to actuate the switch 35, the contact 54 will be shifted into electrical engagement with its cooperating terminal 53. When this occurs, the closing of the pressure switch 18 in response to a reduction of pressure within the container 25, will first complete an electrical circuit for energizing a solenoid 55 to actuate the solenoid valve 20 for admitting air into the circuit for a predetermined period of time. The valve 20 is then automatically closed and the motor 9 is energized to actuate the pump 10 for delivering water into the container 25.

Assuming that the level of the water 37 is low enough so that the switch 35 is not actuated, its movable contact 54 will be in electrical engagement with the terminal 52. Under these conditions, closing of the pressure switch 18 will complete a circuit from the source represented by the line L–1 through the now closed contact 51 and a conductor 58 to the movable contact 54. The circuit then continues through the terminal 52 and a pair of conductors 59 and 71 to a rectifier 72. The circuit then proceeds through a capacitor 73 and a coil 74 of a relay 60. Energization of the coil 74 actuates the relay 60 to open its normally closed contact 57 and close its normally open contact 78. The closing of the contact 78 completes a circuit from the conductor 59 through a resistor 70, a conductor 56, a conductor 77 and the now closed contact 78 through a conductor 76 and a fuse or motor protector 79. The circuit then continues through a conductor 84 to the starter winding 80 of the motor 9, through a conductor 81 and the normally closed contact 82 of a relay 65. From the closed contact 82 the current flow continues through a capacitor 83 and a conductor 66 to return to its source represented by the line L–2 through the now closed pressure switch 18. Of course, after the starter winding 80 initiates operation of the capacitor motor 9, the current is redirected through its main winding 85 and a conductor 62 to a coil 63 of the relay 65. Energization of the coil 63 opens the normally closed contact 82 of the relay 65 to interrupt the circuit through the starter winding 80. From the coil 63 the flow of current continues through the conductor 66 and the now closed pressure switch 18 to the source represented by the line L–2.

The above description describes the energization of the pump motor 9 when the level of the water 37 is low enough so that the float switch 35 is not actuated. However, when the amount of air in the container 25 is dissipated sufficiently, a greater amount of water will be required in the container 25 to achieve the desired pressure for deactuating the pressure switch 18. When the level of the water thus rises, the float 36 rises with it to actuate the float switch 35. When this occurs, its movable contact 54 moves out of engagement with its cooperating terminal 52 and into electrical engagement with its terminal 53. As a result, the next time the pressure switch 18 is closed by a reduction of pressure within the container 25, the solenoid valve 20 will be operated for a predetermined period of time before the motor 9 is energized. The circuit for energizing the solenoid 55 to operate the valve 20 is completed from the source represented by the line L–1 through the now closed contact 51 of the pressure switch 18 and a conductor 58 to the movable contact 54 and the terminal 53 with which it is in engagement. The circuit then continues through a conductor 56 and the normally closed contact 57 of the relay 60 and through the conductor 61 to the solenoid 55 of the valve 20. From the solenoid 55, the circuit continues through the conductor 62 and the coil 63 of the relay 65 to return to its source represented by the line L–2 through the conductor 66 and the now closed contact 50 of the pressure switch 18. Energization of the coil 63 actuates the relay 65 to open its normally closed contact 82 for preventing energization of the circuit through the starter winder 80 of the motor 9. Such energization of the solenoid 55 serves to open the valve 20 for admitting a predetermined amount of air into the system for replenishing the supply above the level of the water 37.

However, after the solenoid 55 is energized for a short period of time, a time delay circuit is completed to deenergize the solenoid 55 for closing the valve 20 and energizing the pump motor 9 to operate the pump for delivering water to the container 55. This circuit flows from the energized conductor 56 into a resistor 70 and the conductor 71 to the rectifier 72 and thence through the capacitor 73 and the coil 74 of the relay 60 to return to its source represented by the line L–2 through the conductor 66 and the now closed contact 50 of the pressure switch 18. Energization of the coil 74 of the relay 60 opens its normally closed contact 57 to interrupt the circuit to the solenoid 55 for deactuating the valve 20 and thereby terminate the admission of air into the system. It also interrupts the circuit to the coil 63 to deactuate the relay 65 and thereby close its normally closed contact 82.

Moreover, the actuation of the relay 60 closes its normally open contact 78 to complete a circuit from the energized conductor 56 and the conductor 77 through the now closed contact 78 and the conductor 76 to the fuse 79. From the fuse 79 the circuit continues through the conductor 84 and the starter winding 80 through the conductor 81 and the now closed contact 82 of the relay 65. From the contact 82 the current flows as previously described through the capacitor 83 and the conductor 66 to return to its source represented by the line L–2 through the now closed contact 50 of the pressure switch 18. In the same manner as previously described, after the motor pump 9 is started, the flow of electrical circuit is diverted through the main winding 85 of the motor 9 and a conductor 62 through the coil 63 of the relay 65. The circuit then continues through the conductor 66 and the now closed contact 52 of the pressure switch 18 to return to its source represented by the line L–2. Energization of the coil 63 actuates the relay 65 to open its normally closed contact 82 for interrupting the circuit that energizes the starter winding 80.

It is therefore apparent that when the desired amount of air is contained within the container 25, a reduction of pressure in the tank 25 will actuate the pressure switch 18 to energize the motor pump 9 for operating the pump 10 to deliver additional water into the container 25 without admitting any additional air. On the other hand, as the air within the tank 25 is dissipated and is reduced to a specific volume, actuation of the pressure switch 18 in response to a reduction of pressure within the container 25 will first actuate the solenoid 20 for a predetermined period of time to admit additional air into the system. After the expiration of the designated period of time, the valve 20 is automatically closed and the motor 9 energized to operate the pump 10 for delivering water into the container 25 until the desired pressure within the container 25 is reached to open the pressure switch 18.

From the foregoing detailed description of the structure and operation of the illustrative embodiment of the present invention, it will be apparent that a new and improved liquid supply circuit has been provided in which the amount of air within the storage tank is maintained at a desired quantity. When the air is dissipated below a particular amount, additional air is automatically admitted into the system the next time the pressure in the container 25 is reduced to call for additional delivery of water thereto. The amount of air admitted each time is carefully regulated and an accurate measurement of the amount of such air admitted into the storage tank is maintained over prolonged use of the apparatus by reason of the operation of the air admission valve which is resistant to corrosion and operated in a positive manner.

Although the illustrative embodiment of the present invention has been described in considerable detail for the purpose of making a full disclosure of the practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of the illustrative embodiments the invention is hereby claimed as follows:

1. In a water suppy system for furnishing water from a source to an outlet; a storage tank connected to the outlet for delivering water thereto; water supply means actuated by a reduction of the pressure in said tank to supply water from the source to said tank; a valve connected in the system and operable when actuated to place the tank in communication with the atmosphere for admitting air into the tank; air indicator means actuated by the dissipation of air in said tank to a predetermined minimum; and control means activated by said air indicator means to delay the operation of said water supply means upon the reduction of pressure in said tank and to thereupon activate said valve for a predetermined period of time to admit a predetermined amount of air into said tank and to activate said water supply means upon the expiration of said period of time for restoring the pressure in said tank to a predetermined value.

2. In a water supply system for furnishing water from a source to an outlet; a storage tank connected to the outlet for delivering water thereto; a source of electrical energy; a pump connected to the water source and to the storage tank for supply water from the source to the tank when energized; an electrical circuit connecting said source of electrical energy to said pump for energizing the latter; a pressure switch connected in said electrical circuit and actuated by a reduction in the pressure in said tank to a predetermined minimum to energize said pump for supplying water to said tank; an air valve connected in the water supply system to admit air into said tank; an air switch connected in said electrical circuit, said switch being actuated by the dissipation of air in said tank to a predetermined minimum; and control means activated by said air switch and operable to momentarily to shut the flow of electrical energy flowing from said pressure switch to delay the operation of said pump when said pressure switch is actuated, said control means diverting the flow of electrical energy to said air valve for a predetermined period of time to actuate the air valve for admitting a specific quantity of air into said storage tank, and upon the expiration of said period of time to direct the flow of electrical energy to said pump for energizing the latter to supply water to said tank.

3. In a water supply system for supplying water from a source to an outlet; a storage tank connected to the outlet for delivering water thereto; a pump in communication with the source and operable to pump the water out of the source and into said storage tank; a solenoid valve connected to admit air into said storage tank when actuated; a source of electrical energy, a motor drivingly connected to said pump; a pressure switch mounted on said tank and operable when actuated to connect said source of electrical energy to said motor for energizing the latter, said pressure switch being actuated by a reduction of the pressure in said tank; a float mounted in said tank to float upon the surface of the water in said tank; a float switch actuated by said float when the amount of air in said tank has been dissipated to a predetermined minimum so that more water is required in the tank to achieve the desired pressure, said float switch being connected so that when it is actuated it completes a circuit from said source through said pressure switch and to said solenoid valve for actuating said solenoid valve to admit air into the system for a predetermined period of time; and a time delay circuit operable when said float switch is actuated to delay the energization of said motor upon actuation of said pressure switch and to deenergize said solenoid valve and energize said motor after the expiration of the predetermined period of time.

4. In a water supply system for supplying water from a source to an outlet; a pump in communication with the source and operable to pump the water out of the source; a storage tank; a motor connected to actuate said pump; a conduit connected to said pump and to said storage tank for transmitting the water from said pump to said storage tank; a valve connected to said conduit to admit air therein when actuated; control means actuated by a reduction in the amount of air in said tank; valve actuating means responsive to the actuation of said control means for actuating said valve to admit air into said conduit for transmission to said storage tank; motor regulator means responsive to the reduction of pressure in said tank for energizing said motor to operate said pump for pumping water to said tank, said regulator means being also operable to activate said valve actuating means when said control means is activated for admitting air into said conduit; and time delay means delaying the energization of said motor for a predetermined period of time until a specific volume of air is admitted into said conduit and then deactuating said valve when the operation of said pump is initiated.

References Cited

UNITED STATES PATENTS

| | | | |
|---|---|---|---|
| 2,100,109 | 11/1937 | Ryan | 103—6 |
| 2,318,066 | 5/1943 | Dodd | 103—6 |
| 2,354,811 | 8/1944 | Jacozzi | 103—6 |
| 3,038,639 | 6/1962 | Anderson | 137—209 |
| 3,065,697 | 11/1962 | Andrew | 103—6 |

DONLEY J. STOCKING, *Primary Examiner.*

W. L. FREEH, *Assistant Examiner.*